United States Patent
Teramoto et al.

(10) Patent No.: US 8,442,177 B2
(45) Date of Patent: May 14, 2013

(54) SIGNAL RECEIVING APPARATUS AND SIGNAL TRANSMITTING SYSTEM

(75) Inventors: Kohei Teramoto, Tokyo (JP); Masaru Kimura, Tokyo (JP); Tsuyoshi Nakada, Tokyo (JP); Fuminori Saito, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 295 days.

(21) Appl. No.: 12/997,765

(22) PCT Filed: Sep. 24, 2009

(86) PCT No.: PCT/JP2009/004813
§ 371 (c)(1),
(2), (4) Date: Dec. 13, 2010

(87) PCT Pub. No.: WO2010/041380
PCT Pub. Date: Apr. 15, 2010

(65) Prior Publication Data
US 2011/0103524 A1 May 5, 2011

(30) Foreign Application Priority Data
Oct. 6, 2008 (JP) .................. 2008-259723

(51) Int. Cl.
*H04L 7/00* (2006.01)
(52) U.S. Cl.
USPC ........................................ 375/372
(58) Field of Classification Search .......... 375/219, 375/259, 355, 376, 370–375
See application file for complete search history.

(56) References Cited

U.S. PATENT DOCUMENTS

| | | | |
|---|---|---|---|
| 7,983,371 B2 * | 7/2011 | McCorkle et al. | 375/355 |
| 2007/0030785 A1 * | 2/2007 | Masui et al. | 369/59.13 |
| 2010/0205343 A1 * | 8/2010 | Tell | 710/305 |

FOREIGN PATENT DOCUMENTS

| | | |
|---|---|---|
| GB | 2244160 A | 11/1991 |
| GB | 2269248 A | 2/1994 |
| JP | 2002-268662 A | 9/2002 |
| JP | 2004-158925 A | 6/2004 |
| JP | 2004-264497 A | 9/2004 |
| JP | 2006-135657 A | 5/2006 |
| JP | 2006-180441 A | 7/2006 |

* cited by examiner

*Primary Examiner* — Don N Vo
(74) *Attorney, Agent, or Firm* — Birch, Stewart, Kolasch & Birch, LLP

(57) ABSTRACT

A signal receiving apparatus 2 has a memory circuit 22, writing of data contained in a digital input signal transmitted from a signal transmitting apparatus 1 is performed using a clock signal separated and created by a PLL circuit 21 from the digital input signal received, and reading is performed using a reference clock signal with quartz accuracy from a reference clock generating circuit 24. To reproduce the digital input signal by correcting the shift between the clock signal and the reference clock signal, the signal receiving apparatus detects the shift between the two clock signals. When the signal receiving apparatus 2 side lags behind the signal transmitting apparatus 1, the data contained in the digital input signal undergoes thinning out, and when it leads, a signal generated from previous and subsequent digital input signal is interpolated.

10 Claims, 7 Drawing Sheets

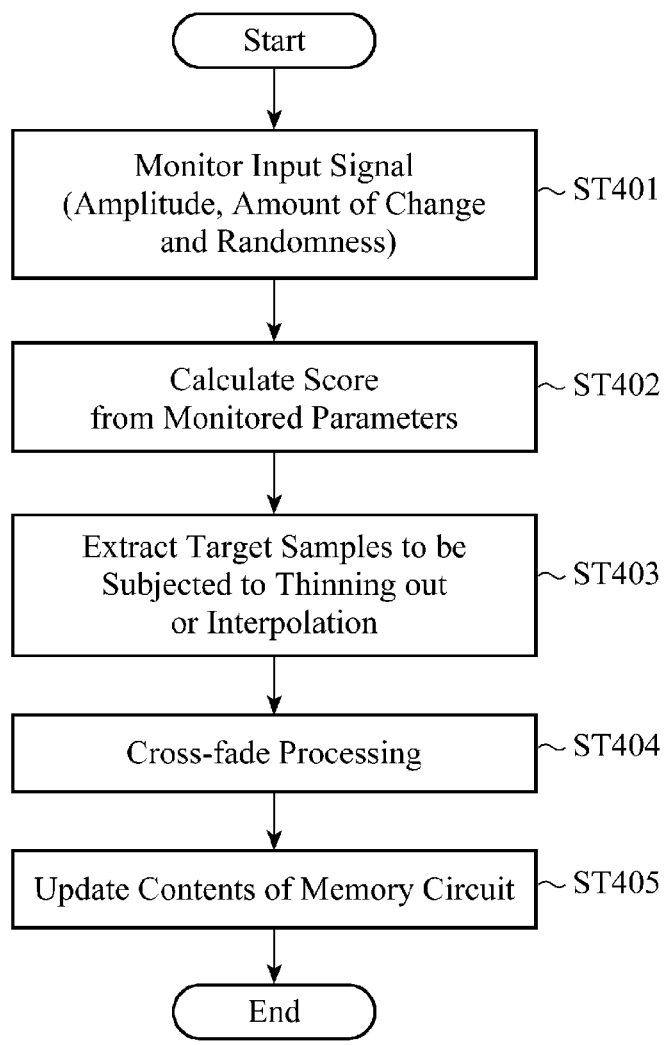
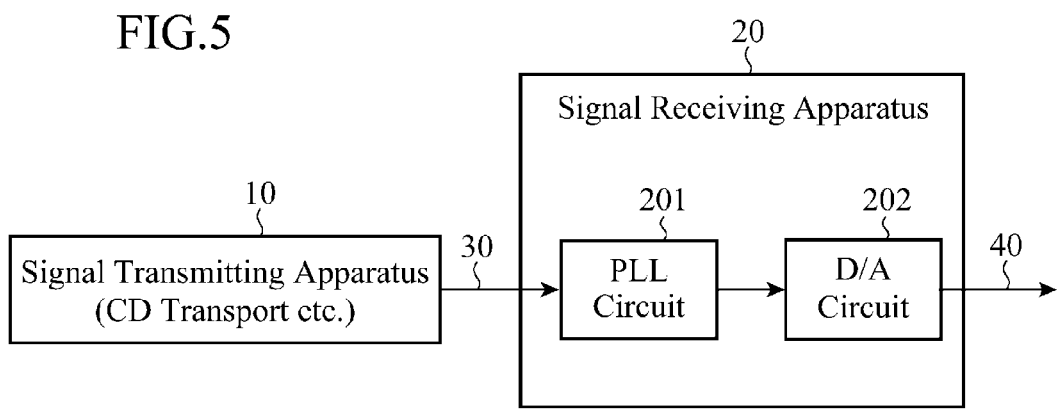

BACKGROUND ART

BACKGROUND ART

SIGNAL RECEIVING APPARATUS AND SIGNAL TRANSMITTING SYSTEM

TECHNICAL FIELD

The present invention relates to a signal receiving apparatus and signal transmitting system suitable for asynchronous digital transmission between a CD transport and a D/A converter, for example.

BACKGROUND ART

In a field of asynchronous digital transmission, a digital signal is transmitted asynchronously between a signal transmitting apparatus such as a CD transport specialized for playback of a CD (Compact Disc) and a signal receiving apparatus including a D/A (Digital/Analog) converter.

To achieve high quality playback in this case, it is essential to absorb a shift (time difference) between clocks used by the signal transmitting apparatus and the signal receiving apparatus, respectively.

A lot of control systems to achieve it have been proposed conventionally. For example, as shown in FIG. 5, a PLL system is generally known that provides a signal receiving apparatus 20 with a PLL (Phase Locked Loop) circuit 201 to separately generate a clock signal synchronized with a signal transmitting apparatus 10 from a digital input signal transmitted via a signal transmission line 30.

Incidentally, the signal receiving apparatus 20 includes a D/A converter (D/A circuit). The D/A circuit 202 converts the digital input signal from the PLL circuit 201 to generate an analog output signal that is supplied to an audio-visual playback system not shown via a signal line 40.

In addition, as shown in FIG. 6, for example, an SRC system is also known that places at a post-stage of a PLL circuit 201 an SRC (Sampling Ratio Converter) circuit 204, to which a reference clock signal is supplied from a reference clock generating circuit 203, and that generates a clock signal at quartz accuracy anew using the SRC circuit 204. Furthermore, as shown in FIG. 7, for example, a two-way twin link system is known that employs a signal receiving apparatus 20 including a D/A circuit 202 as a master, and that establishes synchronization by supplying a reference clock signal from a reference clock generating circuit 203 to the D/A circuit 202 and by sending it back to a signal transmitting apparatus 10 such as a CD transport via a signal transmission line 50.

Moreover, as shown in FIG. 8, a mass buffering system is known that places at a post stage of a PLL circuit 201 a mass memory circuit 205, to which a reference clock signal is supplied from a reference clock generating circuit 203, and that picks out a clock signal from a digital input signal stored in the mass memory circuit 205 at quartz accuracy.

Incidentally, in FIG. 6-FIG. 8, the same components as those of FIG. 5 are designated by the same reference numerals and their duplicate description is omitted here.

On the other hand, in an image playback field, an application for a time axis correcting apparatus is filed that corrects time axis fluctuations efficiently by avoiding repetition of quantization by reading a signal at every prescribed interval while thinning it out or repeatedly reading it to adjust the time axis of digital data transferred between an image memory and an image input device, thereby generating and outputting a high quality image signal (see Patent Document 1, for example).

Prior Art Document

Patent Document

Patent Document 1: Japanese Patent Laid-Open No. 2006-180441.

DISCLOSURE OF THE INVENTION

However, according to the conventional PLL system as shown in FIG. 5, tracking the central frequency and removing jitter components must be performed at the same time. Accordingly, it has its limit because the removal of low-frequency jitter components near the central frequency inherent in the clock signal will deteriorate the trackability, thereby causing deterioration in performance and sound quality such as that in the SN ratio (Signal to Noise Ratio). In addition, according to the SRC system shown in FIG. 6, as for the reference clock generating circuit 203 of the D/A circuit 202, although its accuracy can be increased to the quartz accuracy, as for the jitter components contained in the transmission system, they cannot be separated from the signal component, and hence it makes little difference from the foregoing PLL system.

In addition, as for the twin link system shown in FIG. 7, both the jitter concerning the transmission system and the jitter of the reference clock signal of the D/A circuit 202 can be reduced to the quartz accuracy in performance, the signal transmitting apparatus 10 must be matched to an external clock signal. Accordingly, when there are a lot of playback sources, it requires signal transmission lines 30 and 50 corresponding to the number of the playback sources, thereby being restricted in the system configuration.

Furthermore, according to the mass buffering system shown in FIG. 8, since it causes time delay, the time shift between the digital input signal and analog output signal gradually increases with time. Thus, it has a problem of being unable to be applied to audio-visual playback that demands real-time performance that requires synchronization between the audio and video in particular.

In addition, according to the technique disclosed in the foregoing Patent Document 1, although it tries to prevent a visual problem by scattering image data corresponding to noise extracted per unit time at random, when it is applied to the audio-visual playback, it causes deterioration in sound quality.

The present invention is implemented to solve the foregoing problems. Therefore it is an object of the present invention to provide a signal receiving apparatus and signal transmitting system that have minimum time shift between the digital input signal and analog output signal, that can reduce the jitter to the quartz accuracy, and that is suitably applied to the audio-visual playback.

To solve the foregoing problems, the signal receiving apparatus in accordance with the present invention includes: a PLL circuit for separating and generating a clock signal from a digital input signal; a memory circuit into which the digital input signal is written according to the clock signal generated by the PLL circuit, and out of which the digital input signal is read out according to a reference clock signal of a DA converter; a time difference detecting circuit for detecting time difference between the clock signal and the reference clock signal; and a data processing circuit for processing, when the time difference detecting circuit detects the time difference between the clock signal and the reference clock signal, the digital input signal in accordance with a condition of the time difference detected, and for writing the digital input signal passing through the processing into the memory circuit.

In addition, a signal transmitting-receiving system in accordance with the present invention includes a signal transmitting apparatus for transmitting a digital input signal; and a signal receiving apparatus that is connected to the signal transmitting apparatus via a signal transmission line, and that comprises: a PLL circuit for generating a clock signal from the digital input signal transmitted via the signal transmission line; a DA converter for converting the digital input signal to an analog output signal; a memory circuit into which the digital input signal is written according to the clock signal separated and generated by the PLL circuit, and out of which the digital input signal is read according to a reference clock from a reference clock generating circuit; a time difference detecting circuit for detecting time difference between the clock and the reference clock; and a data processing circuit for processing, when the time difference detecting circuit detects the time difference between the clock signal and the reference clock signal, the digital input signal in accordance with conditions of the time difference detected, and for writing into the memory circuit.

According to the present invention, it can provide a signal receiving apparatus and a signal transmitting system that is capable of minimizing the time shift between the digital input signal and the analog output signal and of reducing the jitter to quartz accuracy, and that is particularly suitable for the application to the audio-visual playback.

BRIEF DESCRIPTION OF THE DRAWINGS

FIG. 4 is a flowchart showing applied operation of the signal receiving apparatus of the embodiment 1 in accordance with the present invention;

FIG. 5 is a block diagram showing a configuration of a signal transmitting system in a conventional example using a PLL system;

BEST MODE FOR CARRYING OUT THE INVENTION

The best mode for carrying out the invention will now be described with reference to the accompanying drawings to explain the present invention in more detail.

Embodiment 1

[Explanation of Signal Transmitting System]

Figure 1:
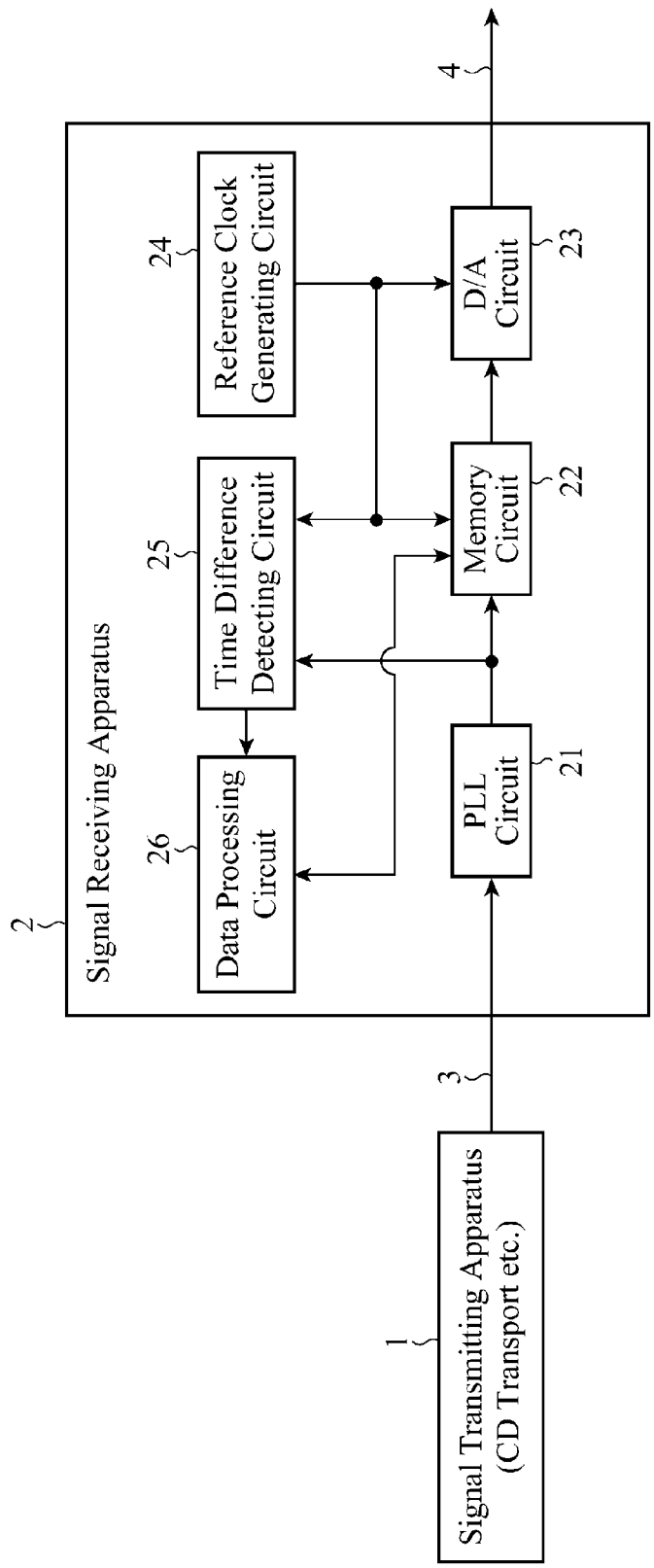
FIG. 1 is a block diagram showing a configuration of a signal transmitting system of an embodiment 1 in accordance with the present invention.

FIG. 1 is a block diagram showing a configuration of a signal transmitting system of an embodiment 1 in accordance with the present invention.

As shown in FIG. 1, a signal transmitting-receiving system of the embodiment 1 in accordance with the present invention comprises a signal transmitting apparatus 1 and a signal receiving apparatus 2 connected to the signal transmitting apparatus 1 via a signal transmission line 3. Incidentally, as for the signal transmission line 3, it can be either wired or wireless.

As shown in FIG. 1, the signal receiving apparatus 2 comprises a PLL circuit 21, a memory circuit 22, a D/A circuit 23, a reference clock generating circuit 24 (clock B), a time difference detecting circuit 25, and a data processing circuit 26.

The PLL circuit 21 separates and generates a clock A from the digital input signal transmitted from the signal transmitting apparatus 1 via the transmission line 3, and supplies it to the memory circuit 22 and time difference detecting circuit 25.

The memory circuit 22 is a comparatively small memory that writes the digital input signal in response to the clock A generated by the PLL circuit 21 and reads it out in response to the reference clock B. The D/A circuit 23 is a D/A converter that converts the digital input signal read out of the memory circuit 22 to an analog output signal, and supplies it to a playback system not shown via an output signal line 4.

The time difference detecting circuit 25 detects the time difference (shift) between the clock A generated by the PLL circuit 21 and the reference clock B from the clock generating circuit 24, and supplies it to the data processing circuit 26.

When the shift between the clock A and the reference clock B is detected by the time difference detecting circuit 25, the data processing circuit 26 processes the digital input signal in accordance with a shift condition detected, and writes to the memory circuit 22. Details of the internal configuration of the data processing circuit 26 and the like will be described later with reference to FIG. 2.

Figure 8:
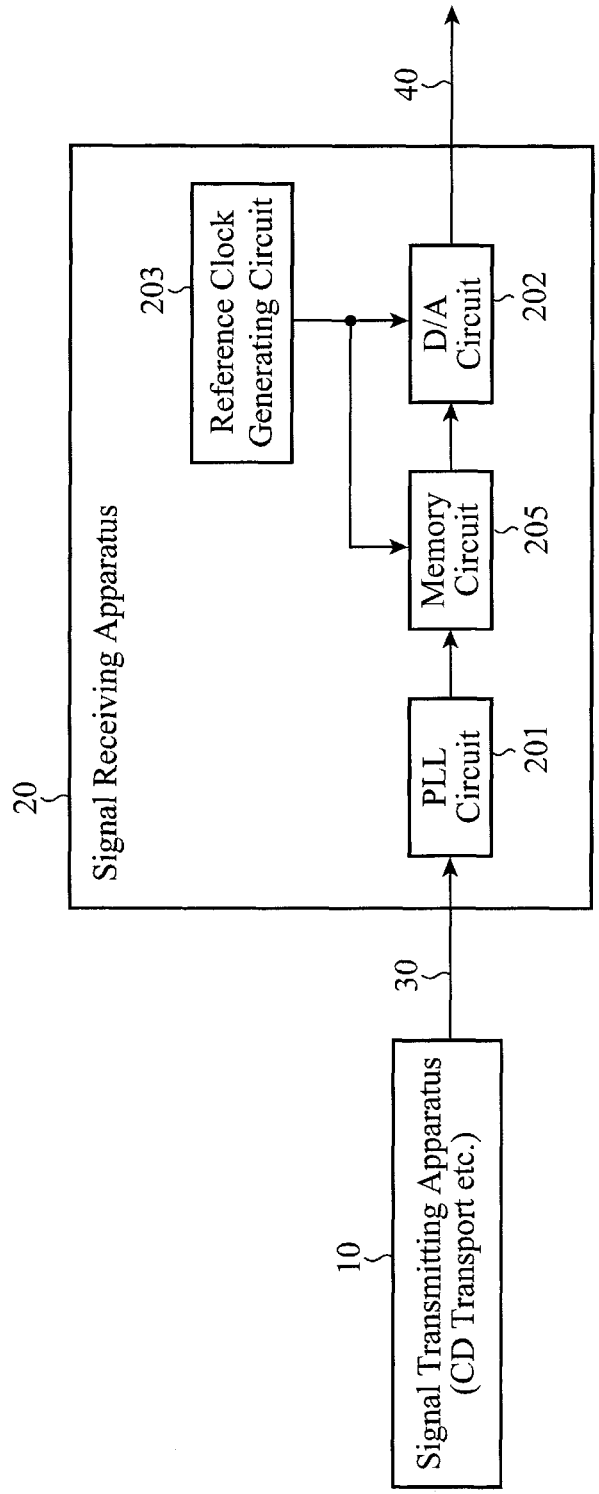
FIG. 8 is a block diagram showing a configuration of a signal transmitting system in a conventional example using a mass buffering system.

As shown in FIG. 1, the signal transmitting system of the embodiment 1 in accordance with the present invention provides the signal receiving apparatus 2 with the memory circuit 22, writes the data signal using the clock A generated from the digital input signal by the PLL circuit 21, and reads it using the quartz accuracy reference clock B generated from the reference clock generating circuit 24. However, as the conventional mass buffering system shown in FIG. 8, if the configuration is used as it is, the shift between the digital input signal and the analog output signal will gradually increase with time, resulting in an overflow if the memory capacity is not enough.

For this reason, according to the signal transmitting system of the embodiment 1 in accordance with the present invention, the signal receiving apparatus 2 is configured in such a manner that it detects the shift between the write clock A and the read clock B, and that paying attention to the fact that the shift is 100 ppm (parts per million) or less in practice (which corresponds to one shift per 0.23 second when the shift is 100 ppm at the sampling frequency 44.1 kHz), it executes thinning out processing of the data when one delay per 0.23 second occurs and interpolation processing of a signal generated from previous and subsequent signals in a case of advance, for example, to achieve the time difference correction.

In addition, the signal transmitting system of the embodiment 1 in accordance with the present invention is configured in such a manner that to minimize sound quality deterioration in an acoustic feeling due to the above-mentioned thinning out processing or interpolation processing, the signal receiving apparatus 2 monitors the amplitude, the amount of change and the randomness of the digital input signal, detects a place where the absolute amplitude is small, a place where the amount of change is small or a place where the randomness is high, and extracts a score calculated by weighting at least two of them as a target signal sample for the thinning out or interpolation.

Furthermore, the signal transmitting system of the embodiment 1 in accordance with the present invention is configured in such a manner that to suppress the deterioration in the acoustic feeling after the thinning out or interpolation of the target signal sampling, the signal receiving apparatus 2 performs shorter cross-fade processing as the randomness increases at the places to which the thinning out processing or interpolation processing is applied and performs longer cross-fade processing as the randomness reduces, thereby attenuating interconnected points of the signal to create a smoother waveform and to make it more difficult to perceive discontinuities. This is due to the fact that the perception of the discontinuities is harder when the randomness is high and the recognition of the discontinuities is easier when the randomness is low.

As described above, according to the signal transmitting system of the embodiment 1 in accordance with the present invention, the signal receiving apparatus 2 has the memory circuit 22, and writing of the data contained in the digital input signal transmitted from the signal transmitting apparatus 1 is performed according to the clock (clock A) generated by the PLL circuit 21 from the digital input signal received, and reading of the data is carried out using the quartz accuracy reference clock (clock B) from the reference clock generating circuit 24.

Here, to correct the shift between the clock A and the reference clock B and to reproduce the digital input signal, the signal receiving apparatus 2 is configured in such a manner that it detects the time difference between them, that when the shift between the two clock signals is detected and the signal receiving apparatus 2 lags behind the signal transmitting apparatus 1, it thins out the data contained in the digital input signal, and that when it advances, it interpolates a signal generated from the previous and subsequent digital input signal. Accordingly, it can provide a signal transmitting system that can minimize the time shift between the digital input signal and the analog output signal, that can reduce the jitter to the quartz accuracy, and that is suitable for the application to the audio-visual playback.

Incidentally, according to the signal transmitting system of the embodiment 1 in accordance with the present invention described above, the system is described on the assumption that the signal transmitting apparatus 1 is a CD transport and the signal receiving apparatus 2 includes a D/A converter. However, it is not limited to the combination. For example, it is applicable to any combination of signal transmitting and receiving apparatuses carrying out asynchronous digital transmission.

[Detailed Explanation of Signal Receiving Apparatus]

Figure 2:
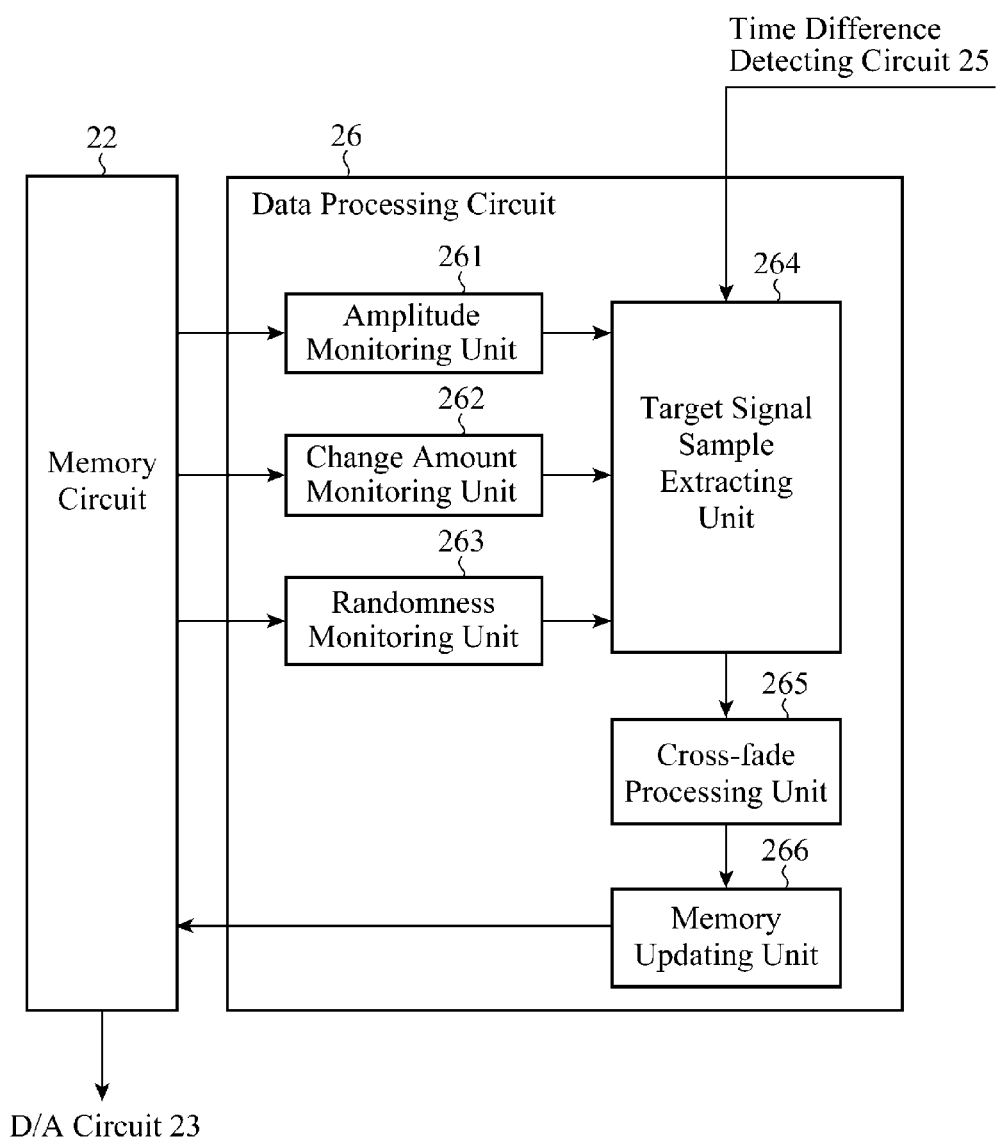
FIG. 2 is a block diagram showing an internal configuration of the data processing circuit of the signal receiving apparatus of the embodiment 1 in accordance with the present invention.

FIG. 2 is a block diagram showing an internal configuration of the data processing circuit 26 included in the signal receiving apparatus 2 of the embodiment 1 in accordance with the present invention.

As shown in FIG. 2, the data processing circuit 26 comprises an amplitude monitoring unit 261, a change amount monitoring unit 262, a randomness monitoring unit 263, a target signal sample extracting unit 264, a cross-fade processing unit 265 and a memory updating unit 266.

The amplitude monitoring unit 261 monitors the amplitude of the digital input signal written in the memory circuit 22, the change amount monitoring unit 262 calculates the amount of change per unit time of the digital input signal written in the memory circuit 22, and the randomness monitoring unit 263 calculates the randomness per unit time of the digital input signal written in the memory circuit 22, and they all supply them to the target signal sample extracting unit 264.

Incidentally, to calculate the randomness, the randomness monitoring unit 263 obtains variance (standard deviation), for example, decides that the randomness becomes higher as the variance of the digital input signal increases, and controls the target signal sample extracting unit 264. Here, the term "variance" expresses the magnitude of the distance (square) between variables and the average, and refers to a well-known statistical method that means an error from the average value.

In addition, the randomness monitoring unit 263 may perform linear prediction of the digital input signal, and employ the prediction error as a scale of randomness decision. In this case, it decides that the greater the prediction error, the higher the randomness. Here, the term "linear prediction" relates to a time series of the digital input signal measured per unit time, and is a well-known arithmetic method that obtains the digital input signal of the next time series according to a prescribed formula using a time series up to now, calculates a prediction error when actually obtaining measured data at the next time, and aims to optimize the subsequent prediction by adjusting weighting coefficients to make the error smaller. Incidentally, as for calculating the randomness, the method based on the linear prediction can achieve more accurate calculation than the method of obtaining the variance.

The target signal sample extracting unit 264 calculates the score by weighting operation of at least two parameters from among the amplitude (level) of the digital input signal monitored by the amplitude monitoring unit 261, the amount of change calculated by the change amount monitoring unit 262 and the randomness calculated by the randomness monitoring unit 263, extracts target signal samples to be subjected to the thinning out or interpolation processing of the digital input signal according to the score calculated here, and supplies to the cross-fade processing unit 265.

The cross-fade processing unit 265 executes the cross-fade operation with the length corresponding to the randomness of the target signal samples extracted by the target signal sample extracting unit 264, and performs the smoothing processing of the digital input signal.

More specifically, the cross-fade processing unit 265 multiplies signals at two adjacent points of time of the target signal samples by a windowing function gradually decreasing with time elapse and by a windowing function gradually increasing with the time elapse, and adds them to obtain a smooth waveform by attenuating the signals at the two points of time, thereby making it difficult to perceive the discontinuities. Here, it applies the shorter cross-fade processing as the randomness of the target signal samples increases and the longer cross-fade processing as the randomness reduces.

Incidentally, the memory updating unit 266 overwrites in the memory circuit 22 the digital input signal after the processing, which passes through the smoothing processing of the places undergoing the thinning out or interpolation by the cross-fade processing unit 265.

Figure 3:
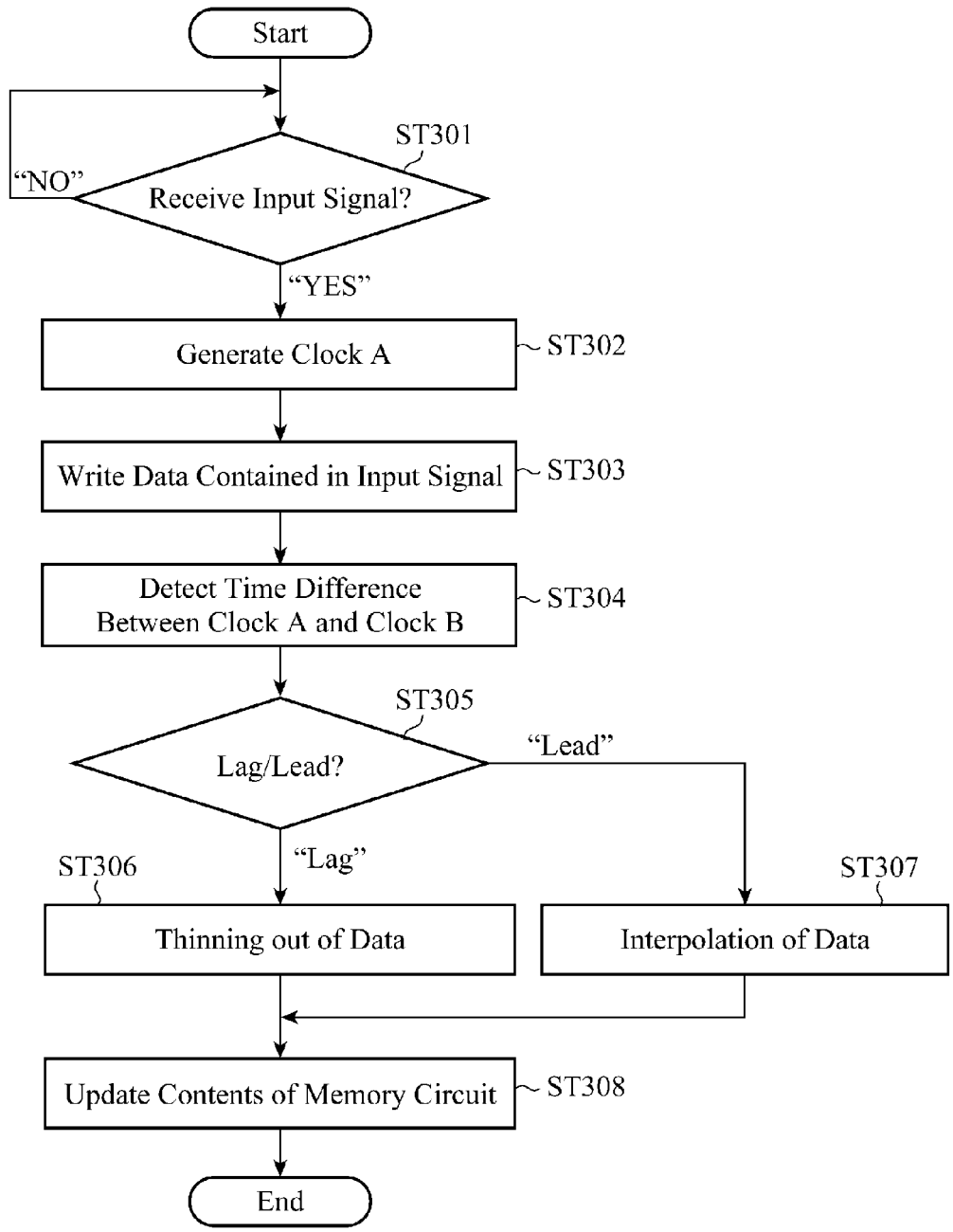
FIG. 3 is a flowchart showing basic operation of the signal receiving apparatus of the embodiment 1 in accordance with the present invention.
Figure 6:
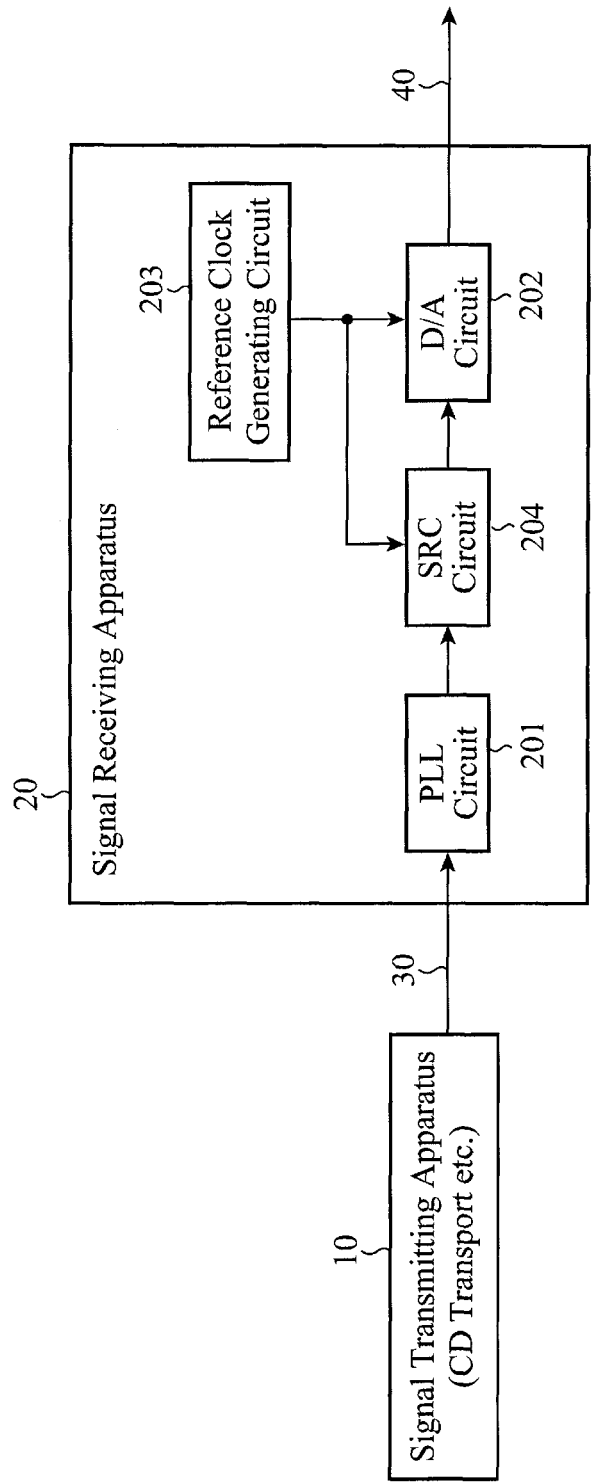
FIG. 6 is a block diagram showing a configuration of a signal transmitting system in a conventional example using an SRC system.
Figure 7:
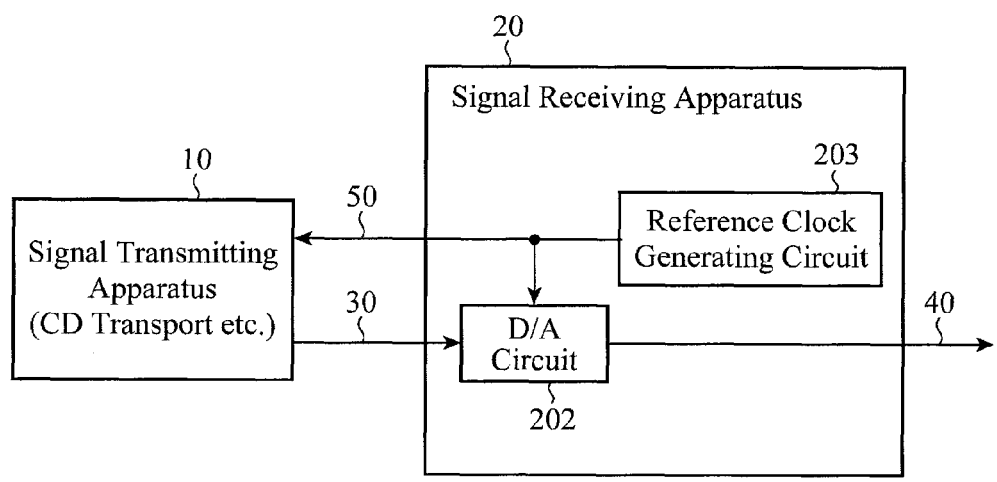
FIG. 7 is a block diagram showing a configuration of a signal transmitting system in a conventional example using a twin link system.

FIG. 3 and FIG. 4 are flowcharts showing the operation of the signal receiving apparatus of the embodiment in accordance with the present invention, which show basic operation (FIG. 3) and applied operation (FIG. 4), respectively. The term "basic operation" here refers to a basic flow up to the thinning out or interpolation processing of the target signal samples extracted from the digital input signal, and the term "applied operation" refers to the processing for minimizing the sound quality deterioration after the thinning out or interpolation processing.

The operation of the signal receiving apparatus of the embodiment 1 in accordance with the present invention shown in FIG. 1 and FIG. 2 will be described below with reference to the flowcharts of FIG. 3 and FIG. 4.

In the flowchart of FIG. 3, the signal receiving apparatus 2 waits for receiving the digital input signal transmitted from the signal transmitting apparatus 1 via the signal transmission line 3 ("YES" at step ST 301). The PLL circuit 21 separates and generates the clock A from the digital input signal (step ST 302), and writes the data contained in the digital input signal into the memory circuit 22 (step ST 303).

On the other hand, the time difference detecting circuit 25 detects the time difference between the clock A generated and output from the PLL circuit 21 and the reference clock B from the reference clock generating circuit 24. For example, when it detects the shift that occurs once per 0.23 second, it calculates the amount of the shift (including both lag and lead) and supplies it to the data processing circuit 26 (step ST 304).

The data processing circuit 26 receiving it, executes, when a decision is made that the shift is a lag ("lag" at step ST 305), the thinning out processing of the data at the timing (step ST 306). In contrast, when a decision of a lead is made ("lead" at step ST 305), it executes the interpolation processing of the data (step ST 307). Then the data processing circuit 26 overwrites the data processed, which is generated as a result of the thinning out or interpolation processing, on the memory circuit 22, thereby updating the contents of the digital input signal (step ST 308).

To minimize the sound quality deterioration due to the thinning out or interpolation, the data processing circuit 26 further monitors the amplitude, the amount of change and the randomness of the digital input signal with the amplitude monitoring unit 261, the change amount monitoring unit 262 and the randomness monitoring unit 263, respectively, as shown in the flowchart of FIG. 4, detects places with a small amplitude absolute value, places with a small amount of changes and places with high randomness, and delivers them to the target signal sample extracting unit 264 (step ST 401).

Receiving them, the target signal sample extracting unit 264 calculates the score by the weighted operation of at least two of the amplitude, the amount of changes and randomness (step ST 402), extracts the places with a high score as the target signal samples to be subjected to the thinning out or interpolation, and delivers them to the cross-fade processing unit 265 (step ST 403).

The cross-fade processing unit 265 executes the cross-fade operation in the length corresponding to the randomness of the signal samples extracted by the target signal sample extracting unit 264, thereby carrying out the smoothing processing of the digital input signal.

More specifically, to suppress the deterioration in the acoustic feeling after the thinning out or interpolation processing of the target signal samples, the cross-fade processing unit 265 executes shorter cross-fade processing as the randomness increases of the places subjected to the thinning out or interpolation processing (step ST 404), and executes longer cross-fade processing as the randomness decreases to make a smoother waveform by attenuating the connecting point of the signals, thereby making it difficult to discern the discontinuities.

Incidentally, the memory updating unit 266 overwrites on the memory circuit 22 the data after the processing, which passes through the smoothing processing of the places subjected to the thinning out or interpolation processing by the cross-fade processing unit 265 (step ST 405), and completes a series of applied operation to suppress the deterioration in the acoustic feeling involved in the thinning out or interpolation processing of the digital input signal described above.

After that, the D/A circuit 23 reads the data written in the memory circuit 22 one after another, converts to the analog signal and supplies to the playback system. Thus, the audio-visual playback is carried out.

As described above, according to the signal receiving apparatus 2 of the embodiment 1 in accordance with the present invention, it has the memory circuit 22, writes the data contained in the digital input signal transmitted from the signal transmitting apparatus 1 according to the clock (clock A) generated from the received digital input signal using the PLL circuit 21, and reads out the data according to the reference clock (clock B) with the quartz accuracy supplied from the reference clock generating circuit 24. Here, to reproduce the digital input signal by correcting the shift between the clock A and the reference clock B, the signal receiving apparatus 2 is configured in such a manner that it detects the shift between the clock signals, thins out the data contained in the digital input signal when the signal receiving apparatus 2 lags behind the signal transmitting apparatus 1, and interpolates the signal generated from the previous and subsequent digital input signal when it leads. Accordingly, it can provide the signal receiving apparatus that can minimize the time shift between the input and output signals, that can reduce the jitter to the quartz accuracy and that is suitable for the application to the audio-visual playback.

In addition, according to the signal receiving apparatus 2 of the embodiment 1 in accordance with the present invention, to minimize the sound quality deterioration due to the thinning out or interpolation processing, it carries out thinning out or interpolation by extracting samples whose deterioration is difficult to be perceived in the acoustic feeling, thereby being able to offer an advantage of being able to perform, without constraints of the apparatus, playback with the sound quality nearly at the same level as the twin link system having large constraints of the equipment.

Furthermore, it can further reduce the deterioration in the acoustic feeling by applying, after the thinning out or interpolation processing of the samples, the cross-fade processing with a shorter length as the randomness increases at the places subjected to the thinning out or interpolation, and the cross-fade processing with a longer length as the randomness reduces.

Incidentally, as for the functions of the data processing circuit 26 shown in FIG. 2, all of them can be implemented by hardware or at least part of them can be implemented by hardware .

For example, the following processing can be implemented on a computer using one or a plurality of programs, or at least part of them can be carried out by hardware: (1) the data processing in which when the time difference detecting circuit 25 detects the time difference between the clock A and the reference clock B, the data processing circuit 26 processes the digital input signal according to the conditions of the time difference detected, and writes it into the memory circuit 22; (2) the data processing in which when the time difference detecting circuit 25 detects the lag of the reference clock B, the data processing circuit 26 thins out the digital input signal, and when it detects the lead, it interpolates the signal generated from the previous and subsequent digital input signal; (3) the data processing in which the data processing circuit 26 monitors the level and the amount of change of the digital input signal, extracts the samples at which the level of the digital input signal is low and the amount of change is small, and makes them the processing target; (4) the data processing in which the data processing circuit 26 monitors the randomness of the digital input signal, extracts the portions at which the randomness is high, and makes them the processing target; (5) the data processing in which the data processing circuit 26 calculates the variance of the digital input signal, and makes the variance calculated the scale of the randomness decision; (6) the data processing in which the data processing circuit 26 performs the linear prediction operation of the digital input signal, and employs the magnitude of the prediction error as the scale of a randomness decision; (7) the data processing of carrying out weighted operation of at least two of the level, the amount of change and the randomness of the digital input signal, and extracts the samples according to the score calculated; and (8) the data processing of performing the cross-fade processing with the length corresponding to the randomness of the samples extracted.

Industrial Applicability

A signal receiving apparatus and signal transmitting system in accordance with the present invention can offer a signal receiving apparatus and signal transmitting system capable of minimizing the time shift between the digital input signal and the analog output signal, and of reducing the jitter to the quartz accuracy, thereby being suitable for the application to the audio-visual playback in particular. Accordingly, it is preferably used for a signal receiving apparatus and a signal transmitting system, which are suitable for the application to the asynchronous digital transmission between the CD transport and D/A converter, for example.

What is claimed is:

1. A signal receiving apparatus having a DA converter for converting a digital input signal, which is transmitted from a signal transmitting apparatus asynchronously via a signal transmission line, to an analog output signal, the signal receiving apparatus comprising:
a PLL circuit for separating and generating a clock signal from the digital input signal;
a memory circuit into which the digital input signal is written according to the clock signal generated by the PLL circuit, and out of which the digital input signal is read out according to a reference clock signal of the DA converter;
a time difference detecting circuit for detecting time difference between the clock signal and the reference clock signal; and
a data processing circuit for processing, when the time difference detecting circuit detects the time difference between the clock signal and the reference clock signal, the digital input signal in accordance with a condition of the time difference detected, and for writing the digital input signal passing through the processing into the memory circuit.

2. The signal receiving apparatus according to claim 1, wherein
the data processing circuit thins out the digital input signal when a lag of the reference clock is detected by the time difference detecting circuit, and interpolates a signal generated from previous and subsequent digital input signal when a lead of the reference clock is detected.

3. The signal receiving apparatus according to claim 1, wherein
the data processing circuit monitors a level and amount of change of the digital input signal, extracts target signal samples at which the level of the digital input signal is low and the amount of change is small, and employs the target signal samples as a processing target.

4. The signal receiving apparatus according to claim 3, wherein
the data processing circuit performs weighted operation of at least two of amplitude, amount of change and randomness of the digital input signal, and extracts the target signal samples in accordance with a score obtained by the operation.

5. The signal receiving apparatus according to claim 1, wherein
the data processing circuit monitors randomness of the digital input signal, extracts a section where the randomness is high, and employs the section as a processing target.

6. The signal receiving apparatus according to claim 5, wherein
the data processing circuit calculates variance of the digital input signal, and employs the variance calculated as a scale for a randomness decision.

7. The signal receiving apparatus according to claim 5, wherein
the data processing circuit executes linear prediction operation of the digital input signal, and employs magnitude of a prediction error as a scale for a randomness decision.

8. The signal receiving apparatus according to claim 5, wherein
the data processing circuit performs weighted operation of at least two of amplitude, amount of change and randomness of the digital input signal, and extracts target signal samples in accordance with a score obtained by the operation.

9. The signal receiving apparatus according to claim 1, wherein the data processing circuit:
monitors a level and amount of change of the digital input signal, extracts target signal samples at which the level of the digital input signal is low and the amount of change is small, and employs the target signal samples as a processing target; and
performs cross-fade processing with a length corresponding to randomness of the target signal samples.

10. A signal transmitting system comprising:
a signal transmitting apparatus for transmitting a digital input signal; and
a signal receiving apparatus that is connected to the signal transmitting apparatus via a signal transmission line, and that comprises: a PLL circuit for generating a clock signal from the digital input signal transmitted via the signal transmission line; a DA converter for converting the digital input signal to an analog output signal; a memory circuit into which the digital input signal is written according to the clock signal separated and generated by the PLL circuit, and out of which the digital input signal is read according to a reference clock from a reference clock generating circuit; a time difference detecting circuit for detecting time difference between the clock and the reference clock; and a data processing circuit for processing, when the time difference detecting circuit detects the time difference between the clock signal and the reference clock signal, the digital input signal in accordance with conditions of the time difference detected, and for writing into the memory circuit.

* * * * *